Jan. 7, 1958 O. MOSER 2,819,338

TELEPRINT RECEIVER

Filed Oct. 29, 1953 5 Sheets-Sheet 1

Jan. 7, 1958 O. MOSER 2,819,338

TELEPRINT RECEIVER

Filed Oct. 29, 1953 5 Sheets-Sheet 3

United States Patent Office 2,819,338

Patented Jan. 7, 1958

2,819,338

TELEPRINT RECEIVER

Otto Moser, Bern, Switzerland

Application October 29, 1953, Serial No. 388,986

Claims priority, application Switzerland November 1, 1952

6 Claims. (Cl. 178—33)

My invention relates to teletypewriting and similar telegraph receivers in which a start-stop system is controlled by the received code pulse combinations to sequentially select and print the type characters corresponding to the particular pulse combinations arriving during successive start-stop cycles. As a rule, the pulse combinations for controlling the printing mechanism through a single communication channel are in accordance with a five-unit multiplex code, the five signal elements of each pulse combination being preceded by a starting signal that releases the start-stop system of the receiver for one cycle of operation. More particularly, my invention concerns teleprint receivers in which the received pulse combinations are translated and stored by means of a cam-operated translating apparatus whose cam shaft is driven in start-stop motion and imparts selective adjusting movements under control by a code-pulse receiving electromagnet to a group of displaceable selector structures.

In a known teletypewriter of this kind, the code-translating receiving apparatus comprises a number of individual and independently operative translating devices, one for each of the units of the pulse code. Accordingly, five such devices are provided for start-stop operation with a five-unit code. The five translating devices are placed one above the other and separated from one another by partitions of sheet metal. Each individual device has its own control cam, a control lever actuated by the cam, a feeler member joined with the control lever, and a reversing lever acting upon one of five respective selector discs or bars. The cam shaft of this receiving apparatus is revolving when a pulse combination is being received so that each of the five cams imparts motion to the one pertaining control lever. The feeler member, rotatably pivoted on the control lever, then moves toward a control projection integral with the armature of the receiving electromagnet. As a result, the five feeler members are sequentially brought into contact with the respective control projections of the armature; and each feeler member is thus turned about its pivot into one or the other position depending upon the position of the armature, unless the feeler member already occupies that position from its preceding operation. During the feeling operation, the armature, after performing its pulse-responsive movement, is arrested by a latch. As soon as each cam leaves the pertaining control lever, the lever flings back and causes the feeler member to hit upon the reversing lever which then displaces the pertaining one selector disc. The pulse-responsive receiver magnet, the mechanical translating devices and the selector discs are arranged side by side in such a manner that the translating receiver apparatus occupies relatively much space perpendicular to its cam shaft.

It is an object of my invention to simplify the design of teleprint receiving and translating apparatus operating on the above-mentioned principle, and to reduce the number of parts necessary for the apparatus, and to also reduce the overall space requirements of the apparatus. Another, more specific object of the invention is to provide a receiving apparatus suitable for having the pulse-translating means and the printing means form part of a displaceable carriage that shifts along a platen roller to produce the imprints by moving a rotary type carrier against the roller.

To achieve these objects, and in accordance with a feature of my invention, I arrange the individual translating devices on a circle around the start-stop cam shaft and locate the respective control levers of the devices within the operating region of a single cam mounted on the shaft so that these levers are sequentially actuated by the cam during each start-stop revolution of the shaft. I further mount a control member in concentric relation to the cam shaft so that the member is rotatably displaceable between two positions depending upon the position of the reciprocable armature of the pulse-responsive receiver magnet; and I provide this control member with radial arms each having two stop faces selectively engageable with one of the feeler members pivoted to the respective control levers thus causing the feeler member, during the cam-controlled actuation of the control lever, to perform a movement whose direction corresponds to the position then occupied by the armature of the receiver magnet. This feeler movement is transmitted to one of a group of respective selector structures whose mutual positional relation determines the particular type character to be printed.

These and other features of my invention, set forth with particularity in the claims annexed hereto, will be apparent from the following description of the embodiment of my invention exemplified by the drawings, all relating to the same start-stop receiving apparatus of a teleprinter for operation with a five-unit code. The illustrated apparatus is especially designed to be mounted on the carriage of a printer displaceable along a paper-backing platen roller as mentioned in the foregoing.

Fig. 5 shows on a larger scale and more in detail a portion of the mechanism illustrated in Fig. 4; while

Figure 1:
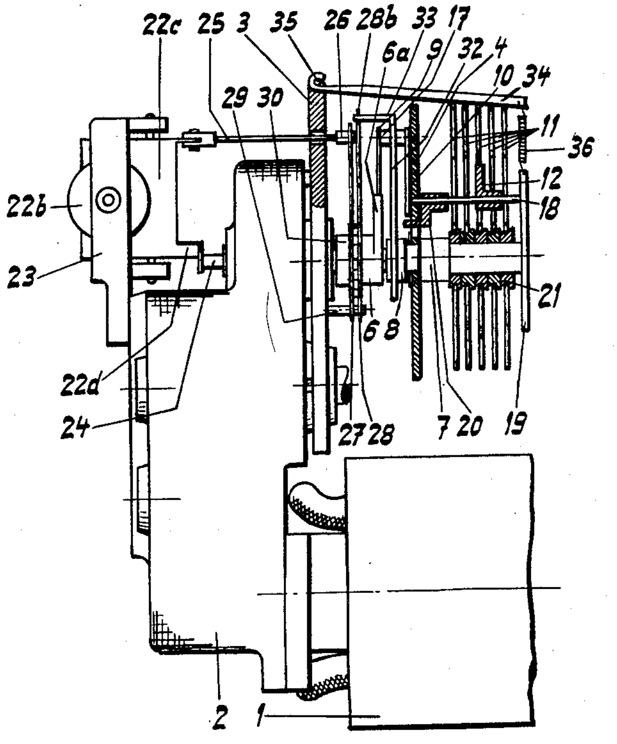
Fig. 1 shows a part-sectional front view of the receiving apparatus as a whole.
Figure 11:
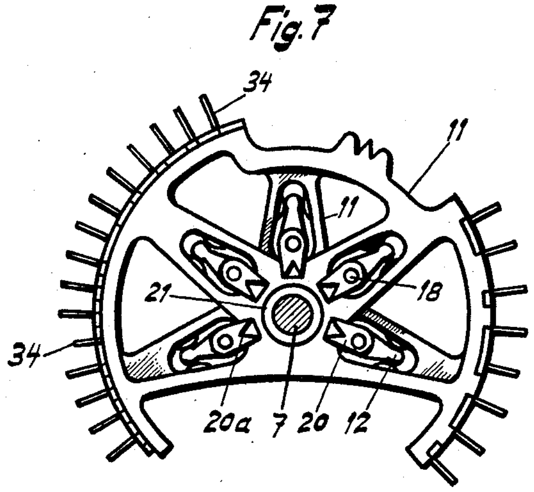
Figures 8, 12:
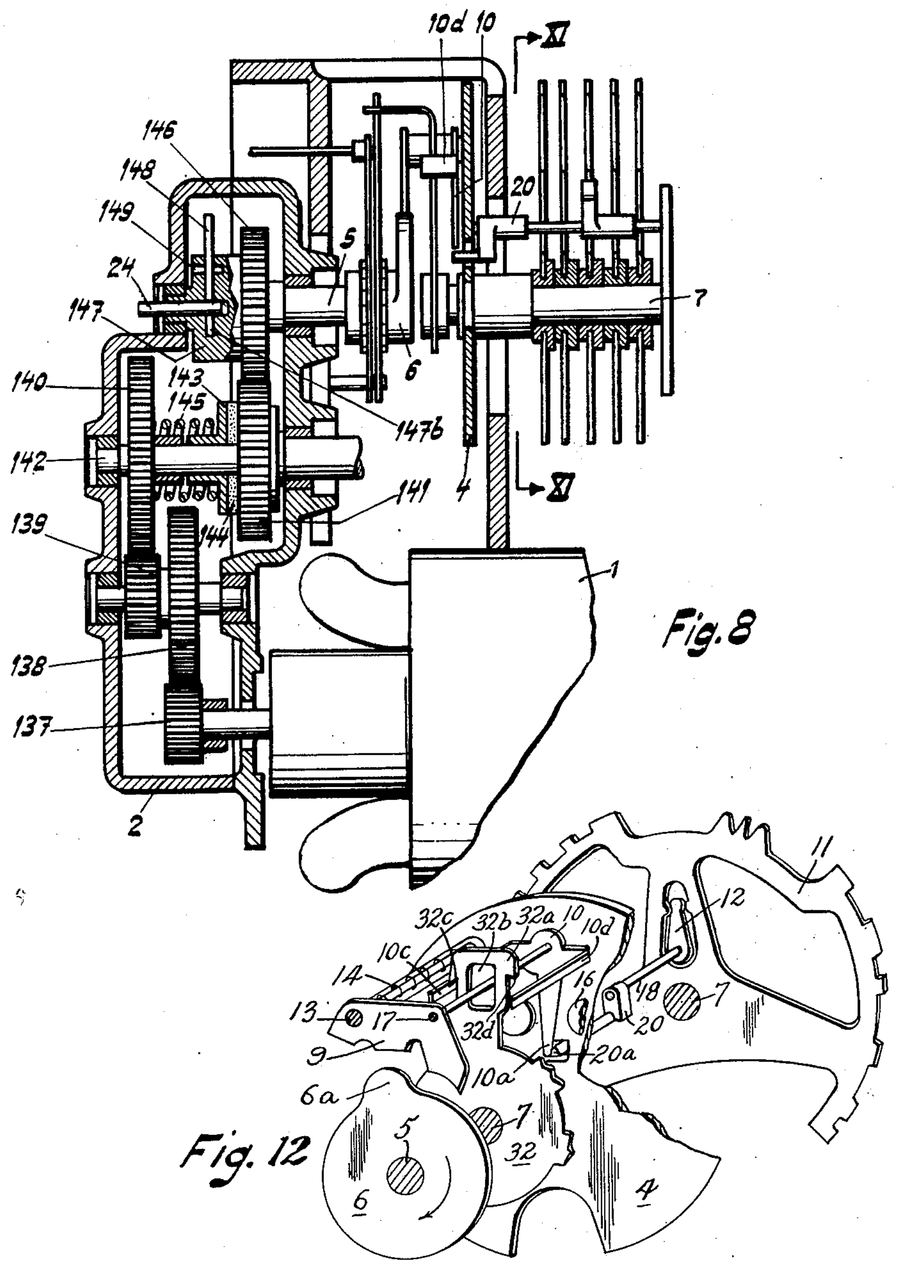
Figure 9:
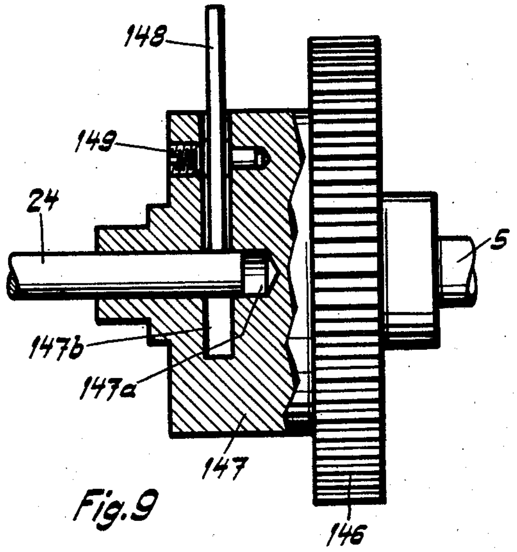
Figure 10:
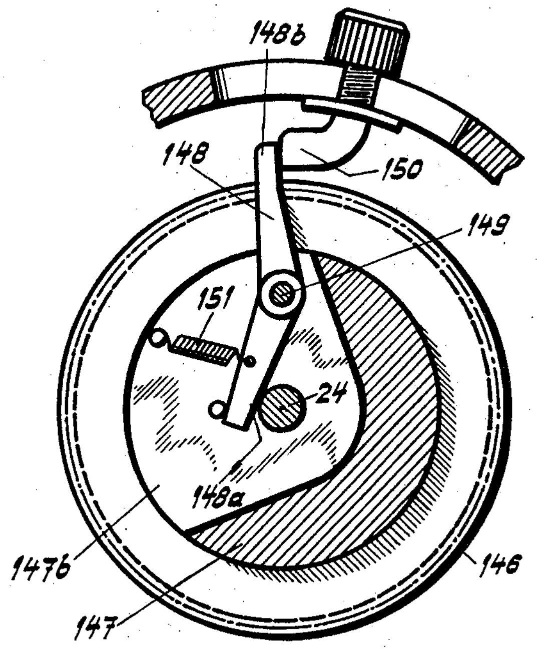

Fig. 8 is a vertical section through the gear box of the receiving apparatus as shown in Fig. 1; Figs. 9 and 10 show, on a larger scale and partly in section, a side view and a front view respectively of a releasing device located in the gear box; and Fig. 11 is a front view of one of a group of selector discs that form part of the receiving apparatus; and Fig. 12 is a perspective and somewhat expanded view, from the left of Fig. 8, onto a portion of the code translating mechanism.

Figures 2, 3:
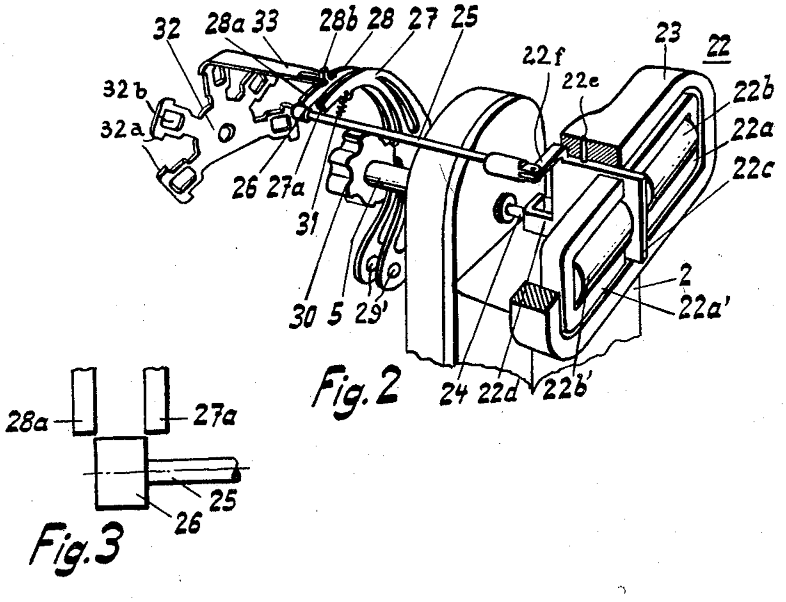
Fig. 2 is a perspective view of the apparatus parts that coact in feeling the position of the armature of the pulse-responsive receiver magnet.
Fig. 3 shows some of these parts separately.

As shown in Figs. 1 and 8, an electric motor 1 is firmly joined with a gear box 2 and with a frame plate 3. These parts, together with another frame plate 4, are rigidly mounted on the carriage structure of the printer (not illustrated). A cam shaft 5 (Fig. 2) is journalled in gear box 2 and extends to the outside where it carries a cam 6 with a single cam lobe **6*a* (Figs. 1, 8, 12) and also a five-lobe cam 30 (Figs. 1, 2). In gear box 2, the cam shaft 5 is connected with the shaft of motor 1 by a gear transmission and a slip clutch described in a later place. Motor 1** runs continuously as long as the receiving apparatus is in operative condition, but cam shaft 5 is normally at rest and is coupled with the motor for a single complete shaft revolution when the release pin 24 (Figs. 1, 2, 8) of the slip clutch is moved toward the gear box 2 by operation of the receiver magnet described below. Hence, the start signal for each pulse combination being received causes the shaft 5 with cams 6 and 30 to commence a start-stop cycle of motion. During the period of this cycle, the receiver magnet responds to the arriving five-unit code pulses proper; and it is the basic function of the illustrated apparatus to translate the code pulse combination into a corresponding, discriminating adjustment of mechanical structure.

Figure 4:
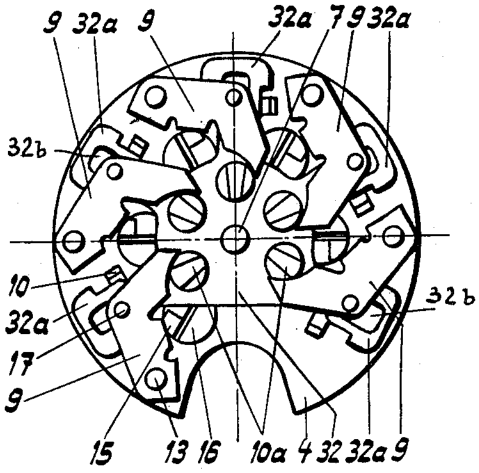
Fig. 4 is an axial view onto the code-translating mechanism of the apparatus, the view being from the left of Fig. 1.
Figure 5:
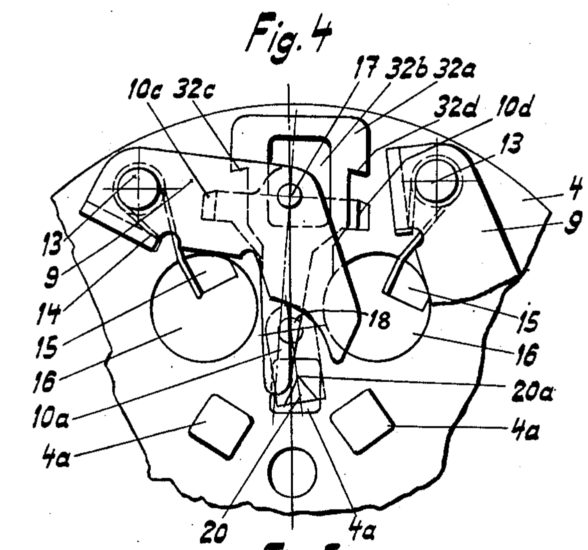

The translating mechanism proper is supported by the above-mentioned frame plate 4 (Figs. 1, 4, 5, 6) and is arranged concentrically to a stationary spindle 7 which is firmly secured to plate 4 by means of a bearing screw 8 and extends coaxially to shaft 5. The translating mechanism comprises five individual devices or mechanism units, each comprising a control level 9 (Figs. 1, 4, 5, 6, 12) operable by the cam 6, a feeler member or "sword" 10 pivotally mounted on lever 9, and a reversing lever 12 acting upon one of the five respective selector discs 11 (Figs. 1, 11, 12). Only one of the five devices is shown in Figs. 1, 5 and 12, but all of them are partially visible in Figs. 4 and 11. The individual translating devices are grouped around the axis of shaft 5 and their respective control levers 9 extend all toward the shaft and into the operating range of the cam lobe 6*a* so that the five control levers 9 are sequentially engaged and actuated by cam 6 during each start-stop revolution of shaft 5.

Each control lever 9 is rotatably mounted on a pivot pin 13 (Figs. 4, 5, 12) secured to plate 4 and is normally biased by a spring 14 to a position of rest in which the lever 9 abuts against a stop pin 15 (Fig. 14). The five stop pins 15 are mounted on plate 4 together with respective stops 16 for the five feeler members 10.

Each feeler member 10 is rotatable on a pivot pin 17 mounted on the pertaining control lever 9 (Figs. 1, 4, 5, 12) and has its tip directed toward the center of the device. The reversing levers 12 sit on respective pins 18 (Figs. 1, 5, 12) which have one end is revolvably journalled in plate 4 while the other end is revolvably journalled in a stationary plate 19 secured to spindle 7. Each revolvable pin 18 carries a swing arm 20 (Figs. 1, 5) of angular shape. The arms 20 extend through respective openings 4*a* (Fig. 5) in plate 4. Each arm has a knife-edge extremity 20*a* (Figs. 5, 12) directed toward the tip 10*a* of one of the respective feeler members 10. The five selector discs 11 (Fig. 1) are mounted on respective hub rings 21 rotatably seated beside each other on spindle 7.

The assembly 22 of the receiver magnet has a frame structure 23 of non-magnetic material firmly attached to gear box 2. Two three-legged cores 22*a* and 22*a'* of magnetizable material are rigidly secured to frame structure 23 so that their respective pole faces lie opposite each other to form an intermediate air gap. The center leg of each core carries an excitation coil 22*b* or 22*b'*. The armature 22*c* of the magnet is pivotally mounted on frame 23 by means of two aligned pivot pins of which the upper pin 22*e* is visible in Fig. 3. The armature is reciprocable about its pivot axis in the air gap between the two magnet cores 22*a* and 22*a'* under control by excitation alternately applied to coils 22*b* and 22*b'*. This alternating excitation is controlled by the code pulses as will be explained below with reference to Fig. 7. The armature 22*c* has a lug 22*d* engageable with the clutch release pin 24 (Fig. 2) so that the first movement of armature 22*c* from the magnet core 22*a* toward the magnet core 22*a'* moves the pin 24 away from the gear box 2 to release one start-stop cycle of the translating mechanism. Another lug 22*f* of armature 22*c* is linked to an axially displaceable rod 25 (Figs. 1, 2) slidably guided on frame plate 3.

The free end of rod 25 carries a piston-shaped stop 26. Stop 26 controls two feeler levers 27 and 28 in dependence upon which of the two end positions is occupied at a time by the reciprocable armature 22*c*. The feeler levers 27 and 28 are rotatably mounted on a common pivot pin 29 rigidly secured to the frame plate 3 (Fig. 1), the respective pivot holes of the feelers 27, 28 being denoted by 29 in Fig. 2. The rotational movements of the feeler levers 27 and 28 about pivot pin 29 are controlled by the above-mentioned five-lobe cam 30 on cam shaft 5. The lobes of cam 30 cooperate with the correspondingly shaped feeler levers 27, 28 in such a manner that the feeler levers, when engaged by one of the rotating cam lobes, are placed into the position relative to the axis of stop 26 shown in Fig. 3. In this position, the stop 26 is free to move back and forth in the axial direction of rod 25 under control by the armature movements of the receiving magnet. When the individual lobes of cam 30 pass out of engagement with the feeler levers 27, 28, these levers, biased by respective springs 31, move their free ends 27*a* and 28*a* toward the stop 26. The spacing between the feeler levers 27 and 28 relative to the axial length of stop 26 is such that one of the respective lever ends can pass laterally along the piston-shaped stop depending upon the position then occupied by the armature 22*c*, while the other feeler lever abuts against the cylinder surface of stop 26 and hence cannot appreciably move about its pivot. In the position of stop 26 illustrated in Fig. 3, the armature 22*c* of the receiving magnet is in an intermediate postion. During the translating operation proper, however, the stop 26 is positioned either toward the left or toward the right of the intermediate position shown in Fig. 3. The one feeler lever 27 or 28 which passes beside stop 26 then prevents the stop and thereby the rod 25 and the armature 22*c* to move back to the previous position. Thus, the feeler lever latches the armature 22*c* in the position once occupied until the next lobe of cam 30 returns the feeler lever to the position illustrated in Fig. 2.

Figure 6:
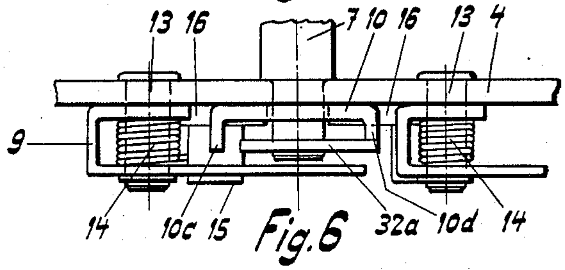
Fig. 6 is a top view of the mechanism portion shown in Fig. 5.

The feeler lever 28 transmits its pivotal movements to a disc or star-shaped control member 32 (Figs. 1, 2, 5, 12). Member 32 has a bifurcated arm 33 which straddles a lug 28*b* (Figs. 1, 2) of lever 28 for imparting a rotational movement to control member 32 in accordance with the pivotal movements of feeler lever 28. Control member 32 is rotatably mounted on the bearing screw 8 (Fig. 1) and has five radial arms 32*a* (Figs. 2, 5, 6). Each arm 32*a* has two projections 32*c* and 32*d* (Figs. 5, 12) which cooperated with respective rectangularly bent lugs 10*c* and 10*d* of one of the respective feeler members 10 (Figs. 4, 5). Each arm 32*a* has an opening 32*b* (Figs. 2, 4, 5, 12). The openings 32*b* are sufficiently large to permit a free movement of the pivot pins 17 (Figs. 1, 4, 5, 12) that link the respective feeler members 10 to the control levers 9 and extend through the openings 32*b*.

A number of selector levers, corresponding to the number of the type characters to be selected in response to the received pulse combinations, are pivotally journalled on the frame plate 3. Only one of the selector levers is visible in Fig. 1 where it is denoted by 34 and shown to be pivoted to frame plate 3 by means of a pivot pin 35. The frame plate 3 is substantially circular, and all selector levers 34 and pins 35 are arranged along the periphery. The selector discs 11 have a number of notches along their respective peripheries. The distribution of these notches, in accordance with the known selector mechanisms for such purposes, is such that only one notch in each disc is aligned with notches in the respective four other discs in any of the available combinations of relative disc positions. Consequently, only one of the selector levers 34 at a time can drop into an aligned row of notches under the biasing effect of a spring 36, as is shown in Fig. 1. The one selectively actuated selector lever is then in position to control the printer, thus translating the pulse combination stored by means of the group of selector discs 11 into a corresponding imprint.

Figure 7:
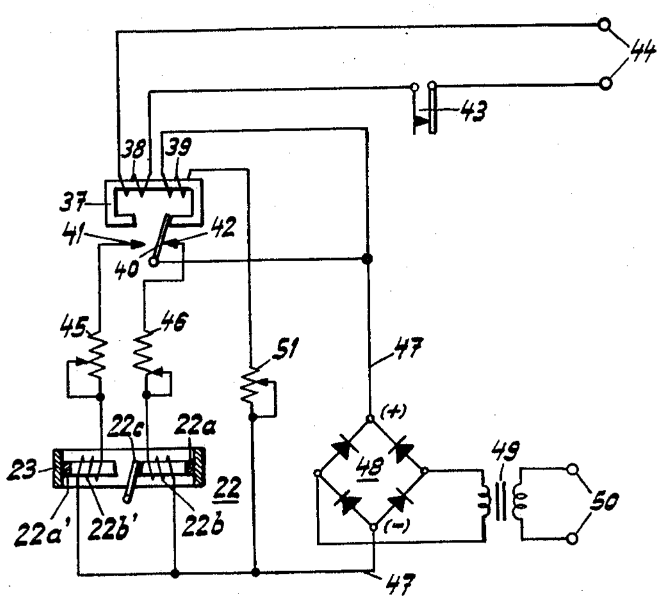
Fig. 7 is a diagram of the electric receiving circuit for the pulse-responsive control of the receiver magnet shown in Figs. 1 and 2.

The receiver control circuit shown in Fig. 7 and described presently is in accordance with the disclosure in my copending application Serial No. 342,845, filed March 17, 1953, Teleprinter Subcriber Station, now Patent No. 2,693,502, issued November 2, 1954.

As illustrated in Fig. 7, the receiver magnet 22 has its two opposingly acting magnet coils 22*b* and 22*b'* connected in an excitation circuit which is energized from a local power source at the receiving substation and is controlled by a relay 37 in response to pulse signals from the communication line. Relay 37 is polarized and has two relay windings 38 and 39 for controlling a movable contact 40 to cooperate with two stationary contacts 41 and 42. Winding 38 is connected in series with a normally closed transmitter contact 43 across the communication-line terminals 44 of the apparatus. Stationary contact 41 is connected with magnet coil 22*b'* in series with a calibrating resistor 45. Contact 42 is connected with magnet winding 22*b* in series with another calibrating resistor 46. The movable contact 40 and the two other ends of windings 22*b* and 22*b'* are connected in a local excitation circuit 47 energized from across the output terminals of a rectifier 48. Rectifier 48 is connected through a transformer 49 to a suitable current supply 50, for instance an alternating current line. The winding 39 of relay 37 is also connected across the output terminals of rectifier 48 in series with a calibrating resistor 51. The local power supply for energizing the receiver magnet 22 may be identical with one needed for energizing the above-mentioned drive motor 1 or any other electrically operated parts of the teleprint receiver; and the rectifier 48, if desired, may consist of a power rectifier used for also operating the motor and other components.

The constant excitation of relay winding 9 is adjusted by means of resistor 51 so that the movable contact 40 of relay 37 is in the illustrated position when the winding 38 receives current from line terminals 44. This condition prevails when the receiving apparatus is in the operative condition while no communication pulses are being received. Consequently, the control circuit of magnet assembly 22 is normally as shown in Fig. 7 so that coil 22*b* is excited and the armature 22*c* is attracted toward the magnet core 22*a*. The starting signal for a pulse combination consists in a temporary interruption of the communication-line current. Consequently, winding 38 becomes deenergized. As a result, the movable contact 40 opens at 42 the local excitation circuit for magnet coil 22*b* and instead closes at 41 the local excitation circuit for magnet coil 22*b'*. This causes the armature 22*c* to move toward the magnet core 22*a'*. As explained, the lug 22*d* then releases the slip clutch and couples the cam shaft 5 with the continuously running drive motor 1 to perform one start-stop cycle of cam revolution.

During the arrival of the immediately following combination of pulses, the cam shaft 5 passes through about three-quarters of a full revolution for storing the five signal pulses of the pulse combination in the assembly of selector discs 11. During the revolution of cam 6, the five control levers 9 are sequentially moved away from the axis. At the same time, the receiving magnet is controlled by the pulse combination so that the armature 22*c*, depending upon whether the code element consists of a current pulse or a current pause, occupies one or the other of its two end positions. These positions are felt off by the feeler levers 27 and 28 cooperating with the piston 26 under control by the five-lobe cam 30. These feeler operations may follow each other in time intervals of 20 milliseconds, corresponding to a suitable unit length of the code combinations. The feeler lever 28 transfers its movement onto the control member 32 (Fig. 2) which accordingly is placed into one of its two angular positions.

Assume that the control member 32, after reception of one individual code element, is in the position shown in Figs. 5, 6 and 12. When the one control lever 9 sequentially correlated to that one code element is being actuated by the revolving cam 6 and turns outwardly about its pivot pin 13 (i. e. upwardly in Figs. 5, 12), the pertaining feeler member 10 moves also outwardly (upwardly in Figs. 5, 12). This moves the feeler lug 10*d* into abutment against the projection 32*d* of the adjacent arm 32*a* of control member 32, so that the feeler member 10, during its continued outward motion, turns clockwise about its pivot pin 17 against the stop 16 (Fig. 5) to a limit position, unless the feeler member 10 already occupies this limit position from its preceding operation.

Until the five feeler members 10 are thus adjusted, the feeler levers 27 and 28 remain in the active position determined by the position of the magnet armature. When the cam lobe 6*a* of cam 6 runs off any just-actuated control lever 9, this lever is biased back to its starting position by the spring 14, and the feeler member 10 moves accordingly toward the center. During this radially inward motion of feeler member 10, its sword tip 10*a* slides along the left side (Figs. 5, 12) of the adjacent swing lever 20, thus turning the swing lever counterclockwise. The rotation of swing lever 20 is transmitted by pin 18 (Figs. 1, 5, 12) to the reversing lever 12 which displaces the one pertaining selector disc 11 unless this disc already occupies the proper position.

The feeler devices operate analogously when the control member 32 occupies the other one of its two angular positions. In the latter case, the lug 10*c* of feeler member 10 abuts against the projection 32*c* of the control member 32 so that the feeler member 10 turns counterclockwise about its pivot pin 17 and causes its tip 10*a* to slide along the right-hand side of the knife edge on swing lever 20, thereby controlling the electrode disc 11 to occupy the other angular position.

In the same manner, the other four elements of each code combination being received by the magnet assembly are translated into corresponding combinative adjustment of the five selector discs 11 and then remain stored in the selector disc assembly for the subsequent control of the printer.

When the station is operating as a transmitter, the contact 43 is opened and closed in accordance with the code combinations to be transmitted. The current pauses thus transmitted to the communication line disturb the balance condition of relay 37 in the same manner as the current passes of a pulse combination arriving during the receiving period of the apparatus. Consequently, the illustrated station is also controlled to operate during the transmitting periods of the station.

As mentioned above, the release pin 24 (Figs. 1, 2, 8), when moved away from the gear box 2 by operation of the receiver magnet, releases a single start-stop cycle of revolution of cam shaft 5. How this comes about will be explained presently with reference to Figs. 8 to 10.)

The gear box 2 encloses a speed reducing train of spur gears 137, 138, 139, 140. Gear 140 is firmly joined with a shaft 142, while gear 141 is revolvable on the same shaft and is driven from gear 140 through a slip coupling comprising a coupling sleeve 143, a felt disc 144 and a spring 145. As long as no signal is being received, i. e. the receiving magnet is in its position of rest, the gear 141 is kept arrested by a spur gear 146 so that the slip coupling runs idle. Gear 146 is firmly connected with a projecting member 147 and is rigidly mounted on the shaft 5 that carries the cam 6. Member 147 has a central bore 147*a* engaged by the release pin 24. A slot 147*b* in member 147 extends in a transverse plane from one side to the other of bore 147*a*. A releasing lever 148 is rotatably mounted in slot 147*b* for movement about a pivot bolt 149. Lever 148 has an arm 148*a* which, in the normal position, abuts against the release pin 24. Another arm 148*b* of lever 148 is held against a stop 150 by the torque transmitted from the slip coupling. The stop 150 is peripherally adjustable to permit displacing the feeler moments of the individual members 10 relative to the releasing moment.

When a starting pulse is being received, the release pin 24 is drawn out of member 147 by the armature of the receiving magnet. This releases the lever 148. Lever 148 commences to rotate about pivot bolt 149 due to the torque transmitted from the slip coupling. Lever 148 continues rotating until the end of its arm 148*b* lies outside the range of stop 150. The spur gears 146 and 142 are now connected through the slip coupling with the drive motor and start performing one revolution. In the meantime, the lever 148 is pulled back by the spring 151 so that the release pin 24 can return into its original position of rest. Then lever 148 is again blocked and its arm 148*b*, upon completion of a single rotation, again arrests the gears 146 and 142 until a new releasing pulse is received.

In the illustrated and described apparatus, the control levers 9, the feeler members 10, the control member 32 and the feeler levers 27 and 28 are all designed as flat sheet-metal parts which are arranged in respective planes parallel to each other and extend radially with respect to the cam shaft 5. As a result, the translating apparatus can be given a considerably more compact construction than heretofore obtainable. This advantage, in conjunction with the arrangement of the selector discs immediately beside the translating mechanism proper, results in a considerable reduction in over-all space requirements and weight in accordance with the abovementioned objects of the invention. By virtue of the circular arrangement of the individual feeler devices about the axis of the cam shaft and the reduction of the necessary feeler control cams to a single cam member, the invention affords a further simplification and space reduction of the entire apparatus.

It will be obvious to those skilled in the art upon a study of this disclosure, that apparatus according to my invention may be modified in various respects without departmenting from the essence of the invention and within the scope of the claims annexed hereto.

I claim:

1. Teleprint receiving apparatus for translating multiplex code pulses into discriminating adjustment of print-controlling structure, comprising a pulse-responsive receiving magnet having an armature movable between two positions, a number of mutually adjacent selector structures corresponding to the number of combination elements of the pulse code and having each a group of notches of which a particular one is aligned with respective particular notches of all other structures for each of the respective pulse combinations to be translated, a start-stop mechanism having a single-revolution shaft and a cam on said shaft operable during the receiving period of each pulse combination, a plurality of individual feeler devices equal to said number and disposed in a circular row about the axis of said cam, each of said feeler devices having a stationarily pivoted control lever biased to one of two positions and projecting into the operating range of said cam to be deflected by said cam to the other position in sequential relation to the other control levers, each of said feeler devices having a feeler member pivotally joined with said control lever to move together with said control lever while being angularly displaceable relative thereto, all of said control levers and all of said feeler members being disposed and movable in two respective planes both extending perpendicular to the axis of said shaft mechanism means connecting said feeler member with one of said respective selector structures for placing said one structure into one of two positions depending upon the angular position of said feeler member relative to said control lever, a control member rotatable between two angular positions about the axis of said cam, armature-position responsive transmission means connected with said control member for setting it in accordance with the positions of said armature, said control member having radial arms adjacent to said respective feeler members, each of said arms having two abutments selectively engageable with the adjacent one feeler member depending upon which position is occupied by said control member during the movement of the pertaining one control lever, whereby each of said feeler members is angularly displaced to correspondingly control the position of one of said selector structures in accordance with the armature position obtaining at the time a single pulse-combination element is effective upon said magnet.

2. In a teleprint receiving apparatus according to claim 1, said armature-position responsive transmission means comprising a reciprocable stop linked with said armature to move in dependence upon movement of said armature, two rotatable feeler levers biased toward said stop, cam means mounted on said shaft and intermittently engageable with said two feeler levers to move them away from said stop, said stop being located in the path of only one of said respective feeler levers depending upon the position of said stop whereby said armature is temporarily latched and only the other one feeler lever is free to appreciably move due to its bias, and one of said feeler levers being coupled with said control member.

3. In a teleprint receiving apparatus according to claim 2, said stop having a direction of reciprocation substantially parallel to the axis of said shaft, and said two feeler levers extending and being rotatably movable in respective parallel planes perpendicular to said axis.

4. Teleprint receiving apparatus for translating multiplex code pulses into discriminating adjustment of print-controlling structure, comprising a pulse-responsive receiving magnet having an armature movable between two positions, a number of coaxial selector discs corresponding to the number of combination elements of the pulse code and having each a group of peripherally distributed notches of which only one in each disc is aligned with notches of all other discs for each of the respective pulse combinations to be translated, a start-stop mechanism having a single-revolution shaft and a cam on said shaft operable during the receiving period of each pulse combination, said shaft and said selector discs having a common geometrical axis, a plurality of individual feeler devices equal to said number and disposed in a circular row about said axis, each of said feeler devices having a control lever stationarily pivoted at a point radially spaced from said cam and movable between two angular positions, each of said control levers having spring means biasing said control lever to one of its positions and each of said control levers when in said one position having a part engageable by said cam so as to be deflected by said cam to the other position in sequential relation to the other control levers, each of said feeler devices having a feeler member pivotally joined with said control lever to move together with said control lever while being angularly displaceable relative thereto, mechanism means connecting said feeler member with one of said respecitve selector structures for placing said one structure into one of two positions depending upon the angular position of said feeler member relative to said control lever, a control member rotatable about said axis between two positions, transmission means connecting said control member with said armature for setting said control member in accordance with the positions of said armature, said control member having radial arms adjacent to said respective feeler members, each of said arms having two abutments selectively engageable with the adjacent one feeler member depending upon which position is occupied by said control member during the movement of the pertaining one control lever, whereby each of said feeler members is angularly displaced to correspondingly control the position of one of said selector structures in accordance with the armature position obtaining at the time a single pulse-combination element is effective upon said magnet.

5. Teleprint receiving apparatus for translating multiplex code pulses into discriminating adjustment of print-controlling structure, comprising a pulse-responsive receiving magnet having an armature movable between two positions, a number of adjacent selector structures corresponding to the number of combination elements of the pulse code and having each a group of notches of which a particular one is aligned with respective particular notches of all other structures for each of the respective pulse combinations to be translated, a start-stop mechanism having a single-revolution shaft and a cam on said shaft operable during the receiving period of each pulse combination, a frame plate rigidly joined with said magnet and extending perpendicular to said shaft, a plurality of individual feeler devices equal to said number and disposed in a circular row about said axis, each of said devices having a control lever movable in a plane parallel to said plate and pivoted to said plate at a point spaced from said cam, said plate having stops engageable by said respective control levers, respective springs connected with said control levers and biasing them to abutting position against said stop, each of said control levers when in said abutting position being located in the operating range of said cam so as to be temporarily deflected away from said stop in sequential relation to the other control levers, each of said feeler devices having a feeler member pivotally joined with said control lever to move radially away from said axis during the cam-controlled deflection of said control lever, each of said feeler members having two projections symmetrical to the pivot point of said feeler member, mechanism means connecting said feeler member with one of said respective selector structures for placing said one structure into one of two positions depending upon the angular position of said feeler member relative to said control lever, a control member perpendicular to said axis and rotatable about said axis between two positions, transmission means connecting said control member with said armature for setting said control member in accordance with the positions of said armature, said control member having radial arms adjacent to said respective feeler members, each of said arms having two abutments selectively engageable with one of said two projections of said feeler members depending upon which position is occupied by said control member whereby each of said feeler members is angularly displaced to correspondingly control the position of one of said selector structures in accordance with the armature position obtaining at the time a single pulse-combination element is effective upon said magnet.

6. In receiving apparatus according to claim 4, said mechanism means connecting said feeler member of each of said devices with one of said selector structures comprising a swing lever movable between two positions in a plane parallel to the plane of angular displacement of said feeler lever, said swing lever having a pivot pin parallel to said axis, a reversing lever mounted on said pivot pin to move together with said swing lever and being engageable with one of said respective discs to impart positioning movement to said disc, said feeler member having a tip engageable with either side of said swing lever for shifting it in one and the other direction depending upon the angular position occupied by said feeler member when said control member, upon disengagement from said cam, is biased by said spring means to move said feeler member radially inward.

References Cited in the file of this patent

UNITED STATES PATENTS

| | | |
|---|---|---|
| 1,870,392 | Watson | Aug. 9, 1932 |
| 2,610,247 | Wusteney | Sept. 9, 1952 |
| 2,675,425 | Salmon | Apr. 13, 1954 |